Figure 1:
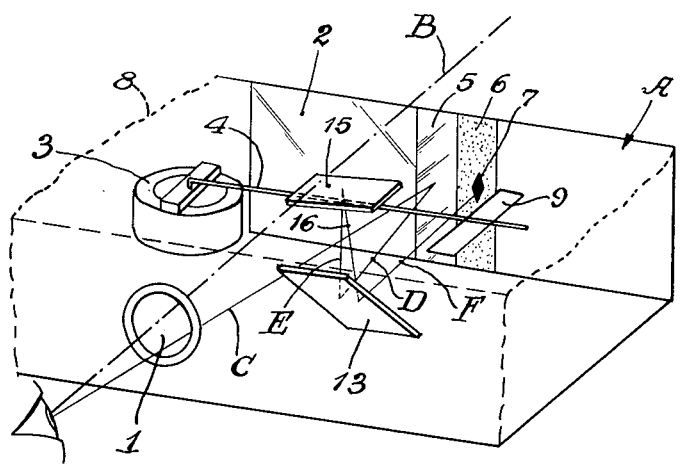

March 21, 1961

H. FEGERT 2,975,685

PHOTOGRAPHIC CAMERA WITH COMBINED VIEW
FINDER AND EXPOSURE METER

Filed July 24, 1958

3 Sheets-Sheet 3

United States Patent Office 2,975,685
Patented Mar. 21, 1961

2,975,685

PHOTOGRAPHIC CAMERA WITH COMBINED VIEW FINDER AND EXPOSURE METER

Helmut Fegert, Stuttgart-Feuerbach, Germany, assignor to Zeiss Ikon A.G. Stuttgart, Stuttgart, Germany Filed July 24, 1958, Ser. No. 750,827

Claims priority, application Germany July 30, 1957

2 Claims. (Cl. 95—10)

The invention relates to improvements in photographic cameras provided with combined view finder and exposure meter.

It is known to reflect the image of the pointer of an exposure meter by a number of reflecting surfaces into the viewing area of a view finder in such a manner that the image of said pointer can be observed in the vicinity of the image of the view finder. The pointer moves along an indicating scale which is illuminated by light coming from the objective lens of the finder. This arrangement is particularly advantageous because the brightness of the indicating area will be determined substantially by the brightness of the object to be photographed. Should this not be the case, the eye would often have to accommodate itself to the differences in the brightness, which is not possible, at least not to the required degree. The motion of the pointer in a plane parallel to the view finder opening is obtained by positioning the axis of the measuring instrument vertical to the optical axis and in a plane parallel to the upper wall of the camera casing.

It is often desirable to read the exposure meter also from a position outside the camera, for instance, in order to be able to determine the ambient light conditions prior to an exposure.

The possibility of such an additional reading, for instance in a viewing opening in the upper wall of the camera casing, i.e. in a plane disposed at a right angle to the view finder opening, is made difficult by the above mentioned arrangement of the exposure meter.

Devices, in which the pointer of the exposure meter could be additionally observed in an opening of the camera casing, are also known. The angularly bent end of the pointer moves in such modification in an intermediate imaging plane of a view finder telescope. This arrangement, admittedly, provides the above mentioned requirement for the second reading possibility, but necessitates the availability of said intermediate imaging plane and results in a rather expensive view finder construction. In case of a view finder constructed according to the principle of reversed Galileo-telescope, or in case of a dioptric view finder without any imaging means, such an intermediate viewing plane is not available so that a second observation possibility of the pointer cannot be realized.

In order to permit such an additional reading possibility of the pointer of an instrument, without utilization of the view finder, the instrument pointer or rather its mirror image are arranged in accordance with the present invention, in two planes which are positioned at right angles to each other, preferably in planes which are parallel to the upper wall of the camera casing and to the viewing aperture of the view finder.

Since it is desirable that the exposure meter is disposed coaxially with one of the axes of the film spools, or with one of the adjusting knobs of the camera, because such an arrangement would facilitate the operation of the measuring instrument, the exposure meter and the reflecting surfaces are arranged for this purpose in such a manner that the indicator of the instrument moves in a plane which is at least approximately parallel to the upper wall of the camera casing, while the reflected image of the pointer moves in a plane parallel to the view finder opening.

The double viewing possibility of the movement of the pointer, obtained in this manner, will enable the control of the camera, when the camera is removed away from the eye and will also enable the control of the view finder picture during the exposure or during the observation of the view finder picture.

According to the invention, the scale of the exposure meter is illuminated from the direction of the objective lens so that the brightness of the pointer field will be determined in this case essentially by the brightness of the object to be photographed.

The fixed indicator or scale of the instrument is preferably reflected by means of three mirrors into the eye of the observer, when an adjustable measuring instrument is used. In this case one of the reflecting surfaces is disposed in such a manner that the indicator moves directly in front of said surface so that a double imaging of the pointer is eliminated.

Another possibility of making the indicator scale visible together with the fixed mark as a reflected image consists in this, that instead of a mirror a groundglass plate is provided in close proximity of the indicator movement, whereby the scale is disposed on the groundglass plate. The illumination of this surface and of the indicator is effected by the objective lens and a reflecting surface which is also used for reflecting the pointer of the instrument. The reflecting surfaces which are necessary for reflecting the indicator and its scale can be disposed in the camera casing as determined by the construction of the view finder and the arrangement of the measuring instrument. Such an arrangement is possible, particularly in case one of the reflecting surfaces is arranged parallel to the view finder viewing plane and is provided in close proximity to the same; and a second reflecting surface can be provided above the pointer and is inclined only to a small degree relative to the upper wall of the camera casing which second reflecting surface is advantageously disposed directly above the pointer. To optically adjust the whole mirror arrangement in the above described arrangement, it is sufficient to make adjustable only a third reflecting surface or mirror, which is necessary for projecting the scale and the movement of the pointer.

A further simplification of the suggested arrangement can be obtained, when the size of the groundglass plate will limit the reflected image of the pointer of the instrument and of the scale in the eye of the observer; or in case when a mask is provided on the reflecting surface for limiting the size of the reflected image, said reflecting surface being disposed parallel to the viewing opening.

The cover plate of the view finder shaft is preferably used as a carrier of the reflecting groundglass surface, disposed in the plane of the view finder viewing opening. In a preferred example of the present invention the scale and the fixed mark of the exposure meter are also arranged on said groundglass plate.

The eye piece surface of the view finder can also be designed as a semi-transparent mirror to take over the function of a mirror which is disposed in the plane of the viewing surface of the view finder. This design will not only simplify the arrangement of the mirror system, but will also prevent insight viewing into the view finder through the eye-piece surface of the view finder.

The drawing illustrates an example of the invention when employed in a motion picture camera.

Figure 2:
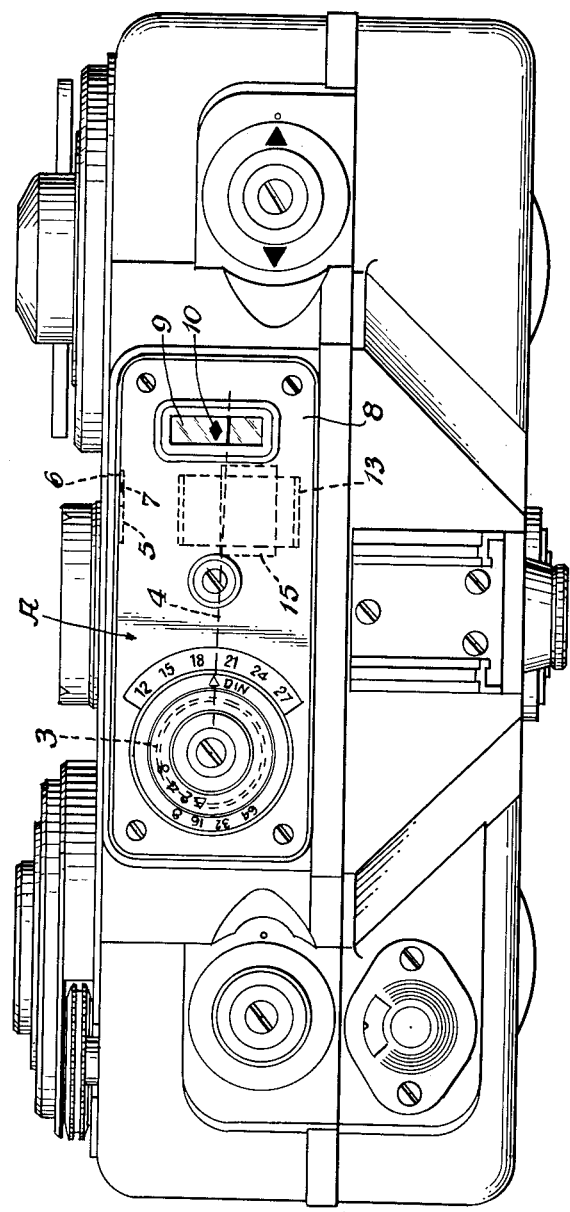
Figure 3:
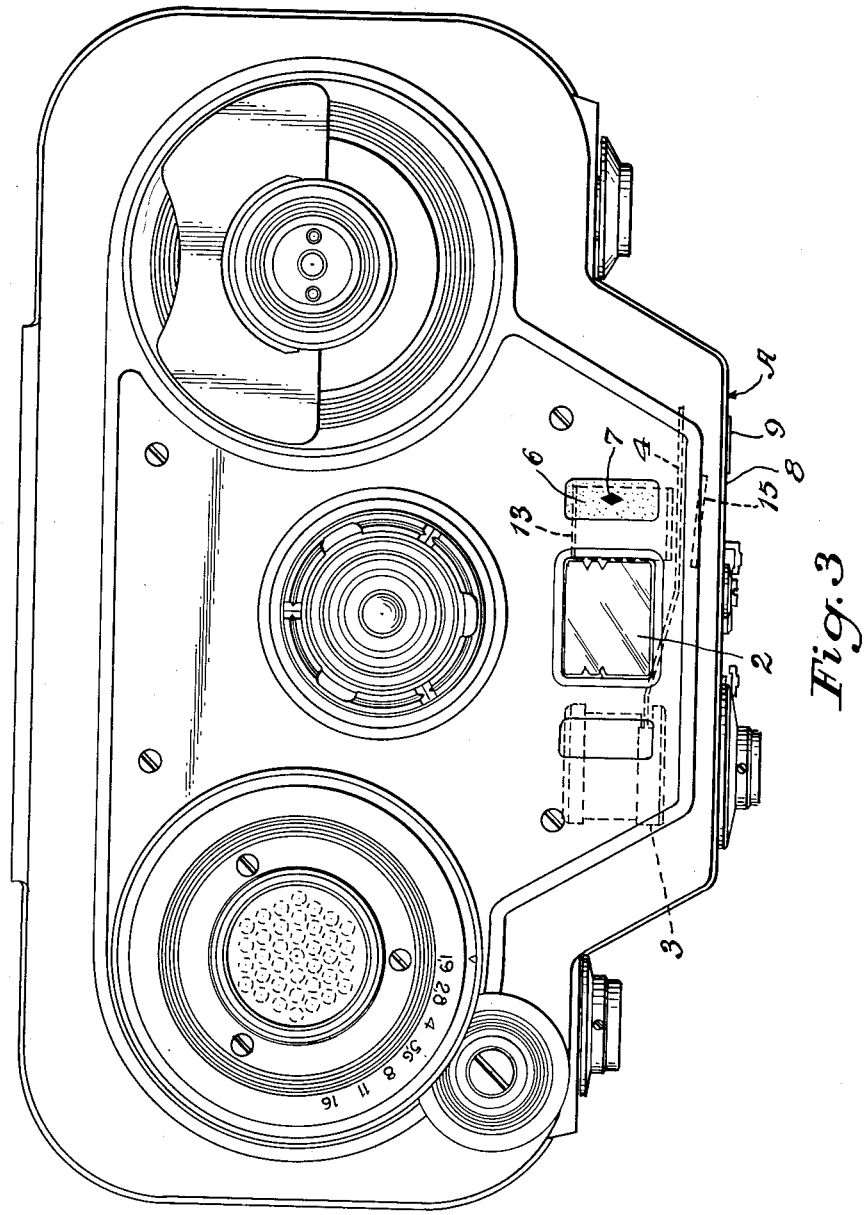

Fig. 1 illustrates diagrammatically the view finder and exposure meter arrangement in the casing of a motion picture camera, Fig. 2 is a top plan view of a motion picture camera provided with a view finder and exposure meter in accordance with the invention, and Fig. 3 is a front elevation view of the camera as shown in Fig. 2.

In Fig. 1, which illustrates the principle of the present invention, the photographic camera for the sake of simplicity is provided with a view finder which is constructed as a direct view finder.

The eye-piece opening of the view finder is designated with 1 and is arranged in the upper portion A of the camera casing. The oppositely disposed viewer window of the finder is designated with 2. The measuring instrument is indicated with 3 and the latter has a movable pointer 4. A reflecting surface 5 is arranged laterally of said viewer window 2 which faces the object to be photographed. Adjacent said reflecting surface 5 is arranged a groundglass plate 6 on which is disposed the adjusting mark 7. Another viewing opening 9 is provided in the upper wall 8 of the camera. Below said opening 9 moves the pointer 4 which can be observed through said opening 9. Through said opening can also be observed a fixed mark 10. The axis of the view finder in the direction of which the view finder picture is visible, is designated with B. In order to determine the correct light value for an exposure to be made, the pointer 4 of the exposure meter has to be adjusted to the fixed mark 7 on the plate 6. For this purpose, the observer directs his view onto the reflecting surface 5 and also along the axis C. The surface 5 reflects in the direction D and a second reflecting surface or mirror 13 reflects in the direction E, and a third reflecting surface or mirror 15 in the direction 16. The rays are deflected by the second mirror 13 along the line F onto the fixed mark 7. Since the pointer 4 is disposed directly in front of the mirror 15, the reflected image of the pointer 4 will be reflected onto the groundglass plate 6 and can be observed in the vicinity of the fixed mark 7, which is clearly distinguished from a bright background.

What I claim is:

1. In a photographic camera, a camera casing, a view finder and an exposure meter arranged in the upper portion of said camera casing, said exposure meter including a measuring instrument having a movable pointer moving in a substantially horizontal plane, said view finder including a vertical viewer window facing the object to be photographed, and an eye-piece opening arranged in horizontally spaced relation rearwardly from said window, a vertical reflecting surface being arranged laterally of said viewer window and facing said eye-piece opening, a vertical ground glass plate being arranged adjacent said reflecting surface and having a fixed mark thereon, two reflecting surfaces arranged in the space between said vertical reflecting surface and said eye-piece opening, said movable pointer extending above and beyond the upper edge of said viewer window and directly in front of one of said two reflecting surfaces, the latter being arranged at such a position with respect to said vertical reflecting surface and said vertical ground glass plate that a reflected image of said pointer is reflected onto said ground glass plate and can be observed through said eye-piece opening together with said fixed mark on said ground glass plate, said vertical reflecting surface being effective to illuminate said pointer and said ground glass plate with said fixed mark thereon with reflected light coming from the photographed object.

2. In a photographic camera, a camera casing, a view finder and an exposure meter arranged in the upper portion of said camera casing, said exposure meter including a measuring instrument having a movable pointer moving in a substantially horizontal plane, said view finder including a vertical viewer window facing the object to be photographed, and an eye-piece opening arranged in horizontally spaced relation rearwardly from said window, a vertical reflecting surface being arranged laterally of said viewer window and facing said eye-piece opening, a vertical ground glass plate being arranged adjacent said reflecting surface and having a fixed mark thereon, two reflecting surfaces arranged in the space between said vertical reflecting surface and said eye-piece opening, said movable pointer extending above and beyond the upper edge of said viewer window and directly in front of one of said two reflecting surfaces, the latter being arranged at such a position with respect to said vertical reflecting surface and said vertical ground glass plate that a reflected image of said pointer is reflected onto said ground glass plate and can be observed through said eye-piece opening together with said fixed mark on said ground glass plate, said vertical reflecting surface being effective to illuminate said pointer and said ground glass plate with said fixed mark thereon with reflected light coming from the photographed object, a viewing opening being arranged in the upper wall of said camera casing above said movable pointer, and another fixed mark being arranged in a horizontal plane spaced below said movable pointer, said last named fixed mark being visible through said viewing opening as is said movable pointer when the latter has been moved within the range of said viewing opening.

References Cited in the file of this patent
UNITED STATES PATENTS

| | | |
|---|---|---|
| 2,213,942 | Riszdorfer | Sept. 3, 1940 |
| 2,242,043 | Sanger | May 13, 1941 |

FOREIGN PATENTS

| | | |
|---|---|---|
| 466,923 | Great Britain | June 8, 1937 |